US012768701B2

(12) United States Patent
Mayer et al.

(10) Patent No.: US 12,768,701 B2
(45) Date of Patent: Oct. 20, 2026

(54) FILL LEVEL MEASURING DEVICE

(71) Applicant: Endress+Hauser SE+Co. KG, Maulburg (DE)

(72) Inventors: Winfried Mayer, Buch (DE); Peter Klöfer, Steinen (DE); Ralf Reimelt, Freiburg (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 240 days.

(21) Appl. No.: 18/712,443

(22) PCT Filed: Nov. 21, 2022

(86) PCT No.: PCT/EP2022/082659
§ 371 (c)(1),
(2) Date: May 22, 2024

(87) PCT Pub. No.: WO2023/099269
PCT Pub. Date: Jun. 8, 2023

(65) Prior Publication Data
US 2025/0189359 A1 Jun. 12, 2025

(30) Foreign Application Priority Data
Dec. 1, 2021 (DE) ..................... 10 2021 131 690.1

(51) Int. Cl.
*G01F 23/284* (2006.01)

(52) U.S. Cl.
CPC .................................. *G01F 23/284* (2013.01)

(58) Field of Classification Search
CPC ........ G01F 23/284; G01S 13/24; G01S 13/88; H01Q 1/225; H01Q 19/08
See application file for complete search history.

(56) References Cited

U.S. PATENT DOCUMENTS 11,022,480 B2 * 6/2021 Daufeld .................. G01S 13/88
2004/0080324 A1 * 4/2004 Westerling ............ G01F 23/284 324/644

(Continued)

FOREIGN PATENT DOCUMENTS

CN 113252138 A 8/2021
DE 10392903 T5 8/2005

(Continued)

OTHER PUBLICATIONS

DE 102018213435 A1 English Translation (Year: 2018).*

*Primary Examiner* — Bernarr E Gregory
*Assistant Examiner* — Isabella A Edrada
(74) *Attorney, Agent, or Firm* — Mark A. Logan; Endress+Hauser (USA) Holding, Inc.

(57) ABSTRACT

A radar based, fill level measuring device for determining fill levels in containers, wherein the fill level measuring device can be applied for a large number of different applications, includes a signal production unit designed to produce a first transmitted radar signals within a first frequency band and supplementally a second transmitted radar signal within a second frequency band that does not overlap with the first frequency band and is clearly separated therefrom. The evaluation unit of the fill level measuring device can determine a first fill level value based on the first received signal. Based on the second received signal potentially another fill level value can be determined. In this way, the fill level measuring device can be adapted as regards frequency band to the particular application. The ascertained fill level can be checked for plausibility by comparing the fill level values ascertained in different frequency bands.

17 Claims, 2 Drawing Sheets

(56) References Cited

U.S. PATENT DOCUMENTS

| | | | | |
|---|---|---|---|---|
| 2004/0173020 | A1* | 9/2004 | Edvardsson .......... | G01F 23/284<br>73/290 V |
| 2015/0253177 | A1* | 9/2015 | Blodt .................... | G01F 23/284<br>324/644 |
| 2016/0313156 | A1 | 10/2016 | Croft et al. | |
| 2017/0059691 | A1 | 3/2017 | Fischer | |
| 2017/0141453 | A1 | 5/2017 | Waelde et al. | |

FOREIGN PATENT DOCUMENTS

| | | | | |
|---|---|---|---|---|
| DE | 102008050329 | A1 | 4/2010 | |
| DE | 102015102002 | A1 | 8/2016 | |
| DE | 102018213435 | A1 * | 2/2020 | ........... G01F 23/284 |
| DE | 102018132285 | A1 | 6/2020 | |
| EP | 3575755 | A1 | 12/2019 | |
| GB | 2589673 | A | 6/2021 | |

* cited by examiner

FILL LEVEL MEASURING DEVICE

CROSS-REFERENCE TO RELATED APPLICATIONS

The present application is related to and claims the priority benefit of DPMA Patent Application No. 10 2021 131 690.1, filed on Dec. 1, 2021, and International Patent Application No. PCT/EP2022/082659, filed Nov. 21, 2022, the entire contents of which are incorporated herein by reference.

TECHNICAL FIELD

The invention relates to a radar based, fill level measuring device, which is adaptable for the most varied of applications.

BACKGROUND

In process automation technology, field devices are applied for registering process parameters relevant for given applications. Thus, for the purpose of registering particular process parameters, suitable measuring principles are implemented in corresponding field devices, in order then to register process parameters, for instance, a fill level, a flow, a pressure, a temperature, a pH value, a redox potential or a conductivity. The most varied of field device types are manufactured and sold by the Endress+Hauser group of firms.

For fill level measurement of fill substances in containers, contactless measuring methods have proven themselves, since they are robust and require low-maintenance. Another advantage of contactless measuring methods is their ability to measure fill level virtually continuously. In the field of continuous fill level measurement, consequently, primarily radar based measuring methods are applied (for the invention, the terminology, radar, refers to signals, or electromagnetic waves, having frequencies between 0.03 GHz and 300 GHz). In such case, in principle, measuring-resolution is higher, the higher the frequency. Established as measuring methods are the pulse travel time method and the FMCW ("*Frequency Modulated Continuous Wave*") method. Radar based fill level measurement is described in greater detail, for example, in "*Radar Level Detection", Peter Devine,* 2000".

Typical frequency bands permitted for radar based fill level measurement lie at 26 GHz, 60 GHz, 80 GHz and 120 GHz, as well as increasingly also at 180 GHz and 240 GHz. In such case, frequency bands lying at higher frequencies are advantageous for many applications, since at given antenna dimensions a higher beam focusing is obtained and, as a rule, more bandwidth is available, which can be applied for greater distance resolution.

Known, however, are also various disadvantages of higher frequencies, or higher frequency bands, which in special applications can lead to degrading or preventing the fill level measured value. These disadvantages present themselves for the most part in the form of interactions of the radar measurement with the fill substance, the atmospheres over fill substances and partially also in container forms, environment- and installation conditions as well as regulatory specifications.

SUMMARY

An object of the invention, therefore, is to provide a radar based, fill level measuring device, which overcomes these disadvantages.

The invention achieves this object by a fill level measuring device for determining a fill level of a fill substance in a container, comprising:

a signal production unit, which is designed
- to produce a first transmitted radar signal within a first frequency band, and
- to produce a second transmitted radar signal within a second frequency band, wherein the second frequency band does not overlap with the first frequency band, but, instead, is clearly separated from the first frequency band, an antenna arrangement, by means of which the first transmitted radar signal in the first frequency band as well as the second transmitted radar signal in the second frequency band are transmittable to the fill substance, and by means of which corresponding received signals are receivable after reflection on the fill substance surface, and an evaluation unit, which is designed
- to determine a first fill level value based on the first received signal, and
- to determine a second fill level value based on the second received signal.

Because the fill level measuring device can potentially ascertain in a number of clearly separated frequency bands corresponding fill level values, the fill level measuring device is usable in a wide variety of applications.

The terminology "unit" means in the context of the invention, in principle, a separate arrangement, or encapsulation, of those electronic circuits, which are provided for a particular application, for example, for high frequency signal processing or as an interface. The corresponding unit can, thus, depending on application, comprise corresponding analog circuits for producing, or processing, corresponding analog signals. The unit can, however, also comprise digital circuits, such as FPGAs, microcontrollers or storage media cooperating with corresponding programs. In such case, the program is designed to perform the required method steps, thus to apply the needed computer operations. In this context, different electronic circuits of the unit can, within the scope of the invention, potentially also use a shared physical memory, or be operated by means of the same physical, digital circuit. In such case, it is not important whether different electronic circuits are arranged within the unit on a shared circuit board or on a number of connected circuit boards.

According to the invention, the first frequency band is always clearly separated from the second frequency band, when the center frequencies of the frequency bands are separated at least by a factor of two and their bandwidths are, in each case, less than a fifth of their center frequencies. A clear separation is also present within the scope of the invention, when the center frequencies of the frequency bands are separated at least by a factor of four and their bandwidths are, in each case, less than half their center frequencies. The center frequency of a frequency band is defined, in such case, as that frequency, which is located exactly centrally within the frequency band. For example, according to this definition, a frequency band with a center frequency of 26 GHz and a bandwidth of 2 GHz correspondingly extends from 25 GHz to 27 Ghz.

In order to be able to produce radar signals in frequency bands clearly separate from one another, the signal production unit can comprise, for example, a corresponding number of appropriately designed, phase controlled control loops (referred to as "PLL, or phase locked loops"). The signal production unit can, within the scope of the invention, also be so designed that it can produce transmitted radar signals not only in two frequency bands, but, instead, supplementally also third transmitted radar signals within third frequency bands, which do not overlap with the first frequency band and the second frequency band. In order to be able suitably to expand the idea of the invention, the evaluation unit needs in these cases to be so developed that it also determines a third fill level value based on a third received signal. As regards hardware, the fill level measuring device of the invention can be put into practice in simple manner, when the first transmitted radar signal and the second transmitted radar signal are transmitted sequentially alternately, and when the first received signal and the second received signal are received correspondingly alternately. In such case, it is sufficient that the signal production unit comprises a single PLL.

The fill level measuring device of the invention can not only be adapted to different applications. Rather, the fill level measuring device can, with corresponding design, also test the fill level values ascertained in the case of mutually differing frequency bands for plausibility. For this, the evaluation unit is so designed that it tests the first fill level value with the second fill level value and/or a possible third fill level value for agreement. When such agrees within a defined tolerance range with at least one of the other fill level values, the fill level measuring device can define the agreeing fill level values as plausible and accordingly output one of these fill level values as fill level. When not all fill level values agree within the defined tolerance range, or when in a frequency band, or, based on one of the received signals, no fill level value is determinable, the evaluation unit can interpret this, in turn, as a failure state of the fill level measuring device or as a defined event in the container, such as an emptying/filling of the fill substance, foam formation, dust, etc. In such case, the fill level measuring device can correspondingly signal the event or the failure state, for example, via a display or a corresponding output signal.

When possible deviations between fill level values ascertained in different frequency bands are insignificant or provably not attributable to failures, the evaluation unit can in the case of corresponding design preferably also output as fill level an equally or unequally weighted average value of the fill level values ascertained for the different frequency bands.

Another variant, which, depending on application, can be advantageous, provides that the evaluation unit, based on the first received signal, the second received signal and/or based on third received signals, creates a masking curve for the received signal of an, in each case, other frequency band. In such case, the masking curve is, such as known in the state of the art, subtracted from the corresponding curve of the received signal, in order, above all, to eliminate, or to suppress, static disturbance echoes in the received signal. Thus, the advantageous effect is utilized that in greatly different frequency bands possible disturbance echoes show up more or less strongly in the, in given cases, complex valued measuring curves of the received signals, depending on origin.

Besides the changing of disturbance echoes as a function of chosen frequency band, the received signals, thus their registered measuring curves, can, moreover, be examined relative to frequency band-dependent changes of other characteristic variables, such as, for example,

- the amplitude of a selected signal maximum,
- a change or a standard deviation of the amplitude of such signal maximum,
- a noise level, and/or
- the number of signal maxima.

In order to be able to detect the change of such characteristic variables as a function of frequency band, and to be able to record the corresponding received signals as measuring curves, the fill level measuring device can, for example, transmit both the first transmitted radar signal as well as also the second transmitted radar signal in a defined plurality of measuring cycles. For this, for example, per measuring cycle another frequency band can be set sequentially one after the other. In this way, the evaluation unit can compare various characteristic variables of the frequency bands of interest, thus of the corresponding measuring cycles, relative to one another.

By comparing selected characteristic variables in the received signals, thus their measuring curves, it can, for example, be detected, which of the frequency bands are especially suitable or unsuitable for the particular application. As a result, the signal production unit can, consequently, work in the most suitable frequency band, which means it produces either only the first transmitted radar signal or only the second transmitted radar signal. In the case of fill substance surfaces, which reflect with significant scattering, because they are, for example, bumpy or wavy, the fill level measuring device can, for example, automatically use the lowest-possible frequency band, since this produces the broadest radiation angle. Corresponding to the signal production unit, the evaluation unit is designed, in such case, such that following the measuring cycles, in which the characteristic variables for the comparison are ascertained, it ascertains the fill level value only in the suitable frequency band, thus only based on its received signal.

The ascertaining of specific, characteristic variables of received signals dependent on the frequency band, and their comparison can, serve not only for finding the frequency band most suitable for the particular application. Rather, the evaluation unit can, with corresponding design, as a function, in each case of ascertained characteristic variables or as a function of their comparison, in turn, ascertain the occurrence of defined events in the container, such as foam formation, dust containing atmosphere or bubble formation in the fill substance. Also, for the case, in which by such method such a possible event is detected, such can be reported by the fill level measuring device.

Besides an automatic choosing of the suitable frequency band by the fill level measuring device, the fill level measuring device of the invention can as regards the desired frequency band also be designed to be manually configurable, such that the signal production unit, depending on user-side configuration, produces either only the first transmitted radar signal, the second transmitted radar signal or the third transmitted radar signal, and such that the evaluation unit determines the corresponding fill level value based only on the corresponding received signal of the desired frequency band.

The antenna arrangement of the fill level measuring device of the invention does need to be designed in such a manner broadbandly such that in all frequency bands corresponding radar signals can be transmitted and received. For this, the antenna arrangement can comprise for all radar signals, and all frequency bands, a shared primary radiator with correspondingly great bandwidth. Alternatively, the antenna arrangement can comprise different primary radiators separately suitable for the first and second radar signals, and each individual frequency band. In such case, the one or more primary radiators can be implemented, for example, in the form of a planar, meander- or patch antenna. For an increased focusing of the outgoing and incoming radar signals, the antenna arrangement can, moreover, comprise a radar-focusing lens, wherein the one or more primary radiators are arranged, for instance, in the focus of the lens. Depending on design of the primary radiators and their arrangement with respect to the lens, the antenna arrangement can either be so designed that the radiation angle of the radar signal is greater, the lower the frequency band, or that the radar signals are transmitted and received with about the same radiation angle.

In order in the different frequency bands not only, in given cases, to be able to achieve different radiation angles, the antenna arrangement can, moreover, depending on embodiment, transmit the first transmitted radar signal, the second transmitted radar signal and/or the third transmitted radar signal with defined polarizations.

BRIEF DESCRIPTION OF THE DRAWINGS

Further details of the present disclosure will now be explained based on the appended drawing, the figures of which show as follows.

DETAILED DESCRIPTION

Figure 1:
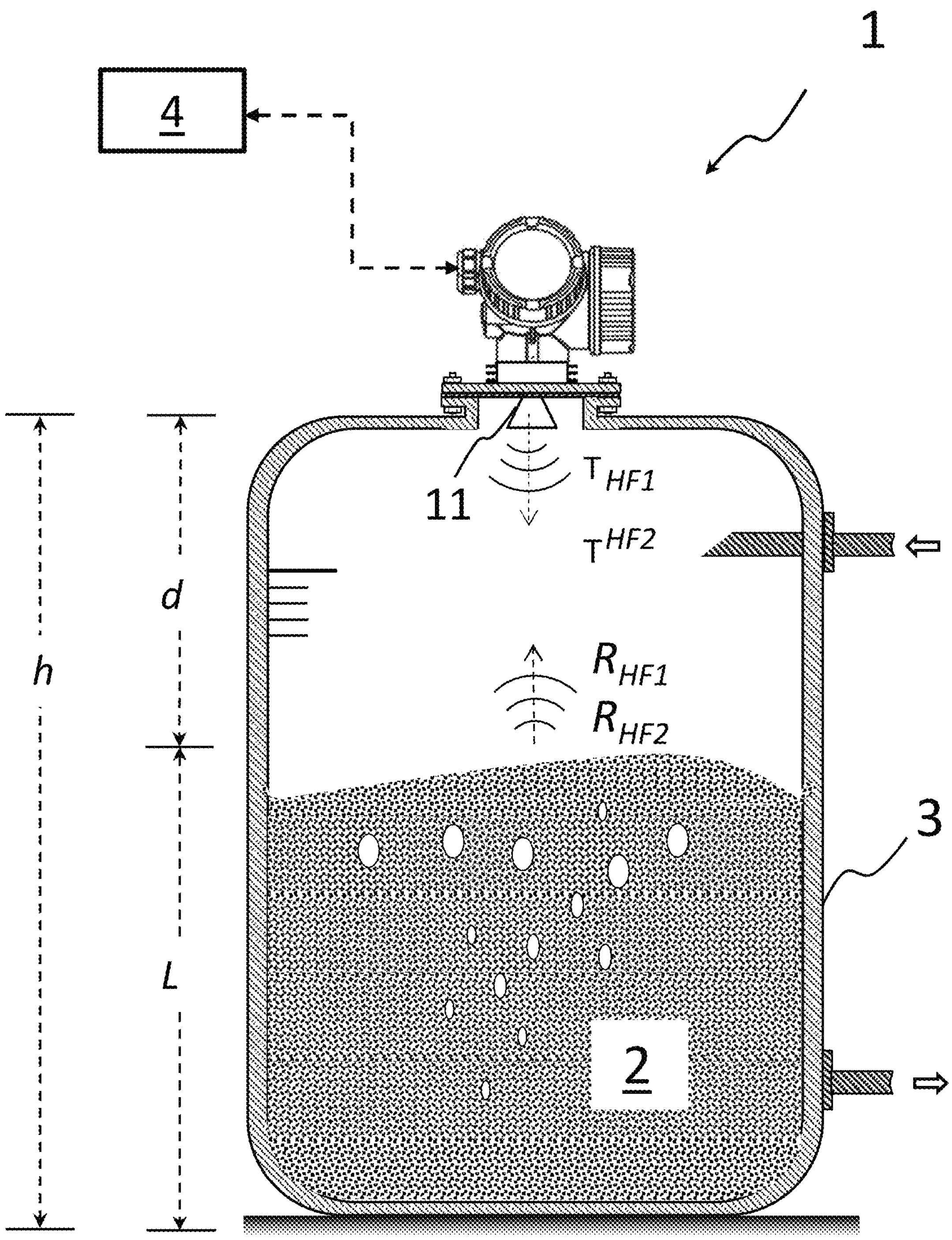
FIG. 1 shows a radar based, fill level measuring device mounted on a container.

For an understanding of the fill level measuring device 1 of the invention in principle, FIG. 1 shows a fill substance 2 in a container 3. The fill level L of the fill substance is to be determined. The container 3 can, depending on type of fill substance 2 and field of application, extend to greater than 100 m high. Also the conditions in the container depend on the type of fill substance 2 and the field of application. Thus, in the case of exothermic reactions, for example, excessive temperature- and pressure loading can be present. In the case of dust containing or ignitable materials, corresponding explosion protection requirements are to be maintained in the container interior.

As a rule, the fill level measuring device 1 is connected via a separate interface unit, such as, for instance, "4-20 mA", "PROFIBUS", "HART", or "Ethernet", with a superordinated unit 4, such as e.g. a local process control system or a decentral server system. In this way, the measured fill level value L can be transmitted, for example, in order, in given cases, to control in- or outgoing flows of the container 3. However, also other information concerning the general operating state of the fill level measuring device 1 can be communicated.

In order to be able to ascertain the fill level L independently of reigning conditions, the fill level measuring device 1 is placed above the fill substance 2 at a known, installed height h above the floor of the container 3. In such case, the fill level measuring device 1 is secured and oriented pressure- and media-tightly at an appropriate opening of the container 3 in such a manner that only the antenna arrangement 11 of the fill level measuring device 1 is directed in the container 3 vertically downwards towards the fill substance 2, while the additional components of the fill level measuring device 1 are arranged outside of the container 3.

Via the antenna arrangement 11, transmitted radar signals $T_{HF}$ within a predefined frequency band are transmitted in the direction of the surface of the fill substance 2. After reflection on the fill substance surface, the fill level measuring device 1 receives the reflected received signals $R_{HF}$, in turn, via the antenna arrangement 11. In such case, the signal travel time t between transmitting and receiving the respective radar signals $T_{HF}$, $R_{HF}$ is, according to $$t = \frac{2*d}{c}$$

proportional to the distance d between the fill level measuring device 1 and the fill substance 2, wherein c the radar-propagation velocity corresponds to the appropriate speed of light. The signal travel time t can be determined by the fill level measuring device 1, for example, by means of the FMCW- or by means of the pulse travel time method. In this way, the fill level measuring device 1 can, for example, based on a corresponding calibration, assign measured travel time t to associated distances d. Moreover, the fill level measuring device 1 can, in turn, determine fill level L according to $$d = h - L$$

when the installed height h is furnished in the fill level measuring device 1. In order to determine signal travel time t and the corresponding fill level value L based on the incoming received signal $R_{HF}$, the fill level measuring device 1 includes a correspondingly designed evaluation unit, in which, for example, the FMCW- or pulse travel time, measuring principle is implemented. Serving for producing the transmitted radar signal $T_{HF}$ in the fill level measuring device 1 is a corresponding signal production unit.

The frequency, or the frequency band, at which the signal production unit of the fill level measuring device 1 produces the transmitted radar signal $T_{HF}$ is selected decisively as a function of character of the fill substance 2. For a highly accurate fill level measurement, in principle, an as high as possible frequency band is advantageous, while in the case of an uneven or moving fill substance surface an as wide as possible radiation angle of the antenna arrangement 11 and, thus, an as low as possible frequency is advantageous. In such case, the terminology "radiation angle" in the context of the invention means that solid angle, at which the antenna arrangement 11 has a defined, equal transmitting intensity, and receiving sensitivity, of, for example, −3 dB.

As a result of these different requirements, each specific application needs to have its own fill level measuring device type, whose frequency band best fits the application. The fill level measuring device 1 of the invention overcomes this problem, in that it can transmit transmitted radar signals $T_{HF1}$, $T_{HF2}$, $T_{HF3}$ in at least two, preferably three, different frequency bands, wherein the frequency bands do not overlap, but, instead, are clearly separate from one another. In order to be able to produce transmitted radar signals $T_{HF1}$, $T_{HF2}$, $T_{HF3}$ in different frequency bands, the signal production unit can be equipped for each frequency band, for example, with a suitable PLL ("phase locked loop").

With a corresponding design, it is, for example, possible, depending on application, to configure the fill level measuring device 1 of the invention manually regarding the desired frequency band. The means, in the case of coarse-grained, weakly reflecting or sloshing fill substance 2, that the fill level measuring device 1 can be preset to a low frequency band of, for example, 6 GHz, while the fill level measuring device 1, thus the signal production unit/evaluation unit, when a highly accurate fill level measurement of liquids with micrometer-resolution is needed, can be configured to a high frequency band, for example, 180 Ghz. A manual configurability of the frequency band can also be used, when in the container 3 other, radar based, fill level measuring devices are operated, whose operation should not be influenced by the setting of different frequency bands.

Besides a manual configuration of the frequency band, the fill level measuring device 1 of the invention can also be so designed that it can set itself to one of the two or more possible frequency bands event-dependently. A relevant event can be, among others, when the evaluation unit based on the corresponding received signal $R_{HF1}$, $R_{HF2}$, $R_{HF3}$, for example, cannot, at the moment, due to low signal strength, determine a fill level value $L_1$, $L_2$, $L_3$. Present as relevant event can be, for example, an emptying/filling procedure, a foam formation, a wavy or moving fill substance surface or a comparable fill substance activity. Depending on event-type, the fill level measuring device 1 can identify the particular event based on the received signal $R_{HF1}$, $R_{HF2}$, $R_{HF3}$, or based on a specific, characteristic variable of the corresponding measuring curve, such as:

- the amplitude of a selected signal maximum,
- a change or a standard deviation of the amplitude of such signal maximum,
- a noise level, and/or
- the number of signal maxima in the received signal $R_{HF1}$, $R_{HF2}$, $R_{HF3}$.

By an automatic, event-dependent setting, or changing, of the frequency band, it is possible, in the case of such an event by selecting a suitable frequency band, in given cases, not only to determine a correct fill level value $L_1$, $L_2$, $L_3$. Rather, the fill level measuring device 1 can, moreover, signal the underpinning event, when it is known, such as, for example, in the case of a foam formation or a rotating stirring mechanism, or when it is unequivocally identifiable, based on a characteristic variable in the received signal $R_{HF1}$, $R_{HF2}$, $R_{HF3}$. An example of an event is a moving fill substance surface. When a high frequency band is set and such an event occurs, this leads because of the deflected received signal to a disappearance of the corresponding signal-maximum. If the fill level measuring device 1 of the invention evaluates the received signal $R_{HF1}$, $R_{HF2}$, $R_{HF3}$ as regards this characteristic variable, then it can, based on the result, namely "no signal-maximum at the corresponding position", for following measuring cycles, set the lowest-possible frequency band, until the value of this characteristic variable changes back to indicate higher frequency bands as desired. Selection of the lowest-possible frequency band increases for wavy fill substance surfaces, due to the resulting broad radiation angle of the radar signal $T_{HF1}$, the probability that the received signal $R_{HF1}$ reflected on the wavy surface will actually be received by the antenna arrangement 11, such that a corresponding first fill level value $L_1$ is determinable.

Depending on type of event, it can, moreover, occur that the corresponding characteristic variable, such as, for example, the signal amplitude of the fill level-maximum in the case of foam formation, does change in the received signal $R_{HF1}$, $R_{HF2}$, $R_{HF3}$ as a function of frequency band. Therefore, the fill level measuring device 1 of the invention, thus the evaluation unit in the case of corresponding design, can, depending on event-type, ascertain the presence of the corresponding event by comparing the corresponding characteristic variables.

Advantageous for an independent, or automatic, change of the frequency band is, moreover, that the fill level measuring device 1 can check the ascertained fill level value $L_1$, $L_2$, $L_3$ of the respective frequency bands for plausibility. When the fill level values $L_1$, $L_2$, $L_3$ of all frequency bands agree in the context of accuracy of measurement, then the corresponding fill level L can be determined to be plausible. In the opposite case, thus when ascertained fill level values $L_1$, $L_2$, $L_3$ do not agree in all frequency bands, this can mean, for example, a disturbance or failure in the fill level measuring device 1, which the fill level measuring device 1 can, in turn, correspondingly signal.

Figure 2:
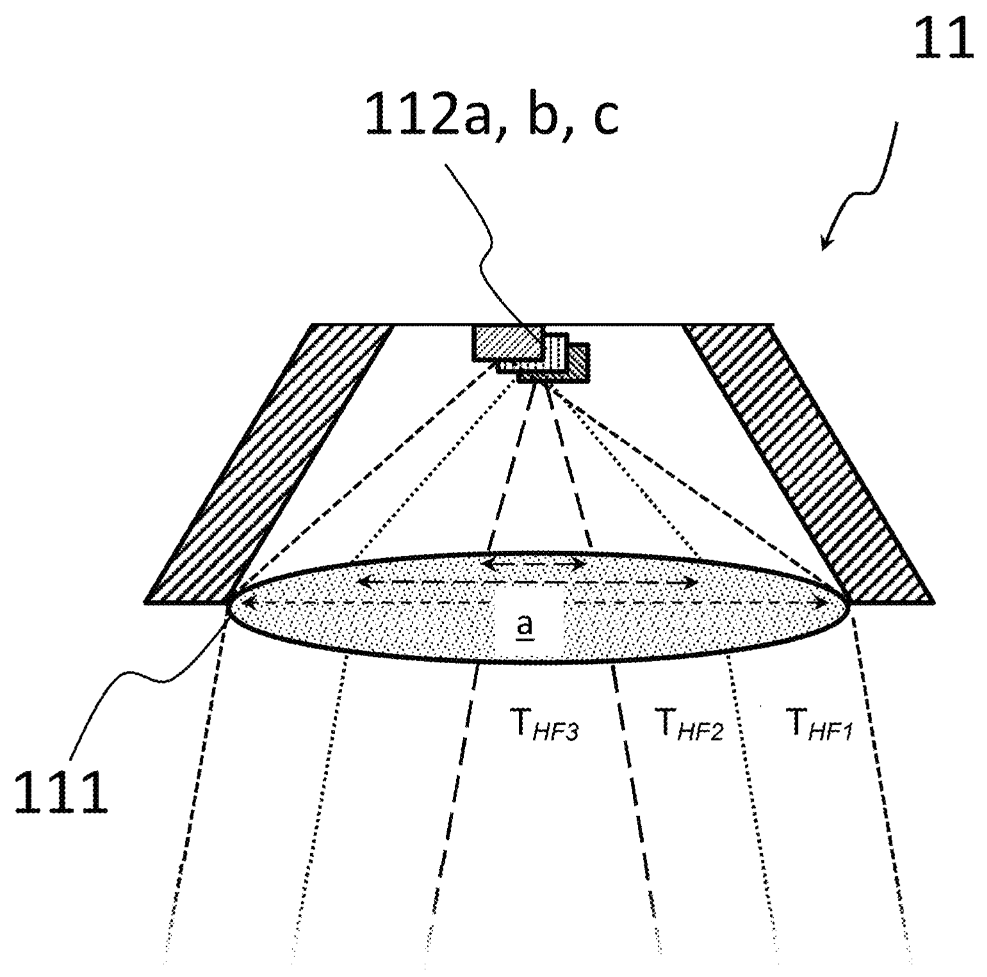
FIG. 2 shows a possible embodiment of the antenna arrangement.

Especially advantageous for pure plausibility checking is when the antenna arrangement 11 transmits the transmitted radar signals $T_{HF1}$, $T_{HF2}$, $T_{HF3}$ of the different frequency bands in the same radiation angle. FIG. 2 shows a design-variant of the antenna arrangement 11 suitable for this. In accordance therewith, the antenna arrangement 11 includes a primary radiator 112*a, b, c* suitable for each of the three frequency bands to be transmitted. In such case, the primary radiators 112*a, b, c* can preferably be designed as monolithic component of each signal production unit, for example, as patch antenna.

The primary radiators 112*a, b, c* are controlled to be coordinated in such a manner that the first primary radiator 112*a* transmits the first transmitted radar signal $T_{HF1}$ in the lowest frequency band, for example, 26 GHz, and receives the corresponding received signal $R_{HF}$. Correspondingly, the second primary radiator 112*b* transmits in a middle frequency band, for example, 80 GHz, while the third primary radiator 112*c* transmits and receives in the highest frequency band, for example, 180 GHz.

In order that the transmitted radar signals $T_{HF1}$, $T_{HF2}$, $T_{HF3}$ produced by the primary radiators 112*a, b, c* are transmitted with an effective bundling, a lens 111 is placed in front of them in the antenna arrangement 11 shown in FIG. 2. The lens 111 is made of a suitable material, such as, for example, PE or PTFE, such that the transmitted radar signals $T_{HF1}$, $T_{HF2}$, $T_{HF3}$, are appropriately focused. In such case, the primary radiators 112*a, b, c* are so designed and arranged relative to the lens 111 that the transmitted radar signals $T_{HF1}$, $T_{HF2}$, $T_{HF3}$ are transmitted after the lens 111 with the same radiation angles. For this, the lens 111 is illuminated, such as shown in FIG. 2, according to $$a \approx N * \lambda_{HF1,2,3}$$

thus, in the lowest frequency band, optimally over its entire cross section. As the formula describes, the total cross section corresponds, in such case, to a whole numbered multiple N of the number of wavelengths $\lambda_1$ of the lowest frequency band. Illuminated by the second primary radiator 112*b* and the third primary radiator 112*c*, thus in the higher frequency bands, is accordingly only that cross sectional area of the lens 111, which corresponds to the beam width $a_{2,3}$ of the particular primary radiator 112*b, c*, such as is also shown in FIG. 2. Due to the generally reciprocal properties of the primary radiators 112 *a,b,c*, and the antenna arrangement 11 as a whole, radiation angle is independent of whether radiation is being transmitted or received.

When the field of application of the fill level measuring device 1 of the invention for each frequency band explicitly requires another radiation angle, the antenna arrangement 11 can, alternatively to that shown in FIG. 2, comprise for all radar signals $T_{HF1}$, $T_{HF2}$, $T_{HF3}$, $R_{HF1}$, $R_{HF2}$, $R_{HF3}$, and all frequency bands a shared primary radiator, such that the radiation angle in the lowest frequency band, for example, 26 GHz, is broadest with, for example, 12°, and the radiation angle in the highest frequency band, for example, 180 GHz is the narrowest with, for example, 3°. Possible middle frequency bands of 60 GHz, 80 GHz or 120 GHz can correspondingly be transmitted/received with a radiation angle lying therebetween, for example, 6°. In such case, it is understood that the fill level measuring device of the invention can also be designed to be able to transmit/receive in more than three different frequency bands.

The invention claimed is:

1. A fill-level measuring device for determining a fill level of a fill substance in a container, comprising:
- a signal production unit that is designed:
  - to produce a first transmitted radar signal within a first frequency band, and
  - to produce a second transmitted radar signal within a second frequency band that does not overlap with the first frequency band;
- an antenna arrangement, including:
  - a first primary radiator embodied to transmit the first transmitted radar signal to the fill substance and to receive a first received signal after reflection the first transmitted radar signal on a fill substance surface;
  - a second primary radiator embodied to transmit the second transmitted radar signal to the fill substance and to receive a second received signal after reflection of the second transmitted radar signal on the fill substance surface; and
  - a radar-focusing lens having a cross-sectional area that is a whole number multiple of a wavelength of the first transmitted radar signal or the second transmitted radar signal, whichever has a lower frequency, wherein the first primary radiator and the second primary radiator are arranged in a focus of the lens; and
- an evaluation unit, which is designed:
  - to determine a first fill level value based on the first received signal, and
  - to determine a second fill level value based on the second received signal.

2. The fill-level measuring device as claimed in claim 1, wherein the signal production unit is further designed to produce the first transmitted radar signal and the second transmitted radar signal in such a manner:
- that the second frequency band has a center frequency that differs from the center frequency of the first frequency band by at least a factor of 2, and/or
- that the first frequency band and the second frequency band each has a bandwidth that is at most a half of its center frequency.

3. The fill-level measuring device as claimed in claim 1, wherein the signal production unit is further designed to produce a third transmitted radar signal within a third frequency band that does not overlap with the first frequency band and the second frequency band, and wherein the signal production unit is further designed to determine a third fill level value based on a corresponding third received signal.

4. The fill-level measuring device as claimed in claim 3, wherein the evaluation unit is designed:
- to test the first fill level value with the second fill level value and/or the third fill level value for agreement and
- to output as the fill level one of the fill level values when such agrees within a defined tolerance range with at least one of the other fill level values, and/or
- to signal a failure state of the fill level measuring device or a defined event in the container when not all fill level values agree within the defined tolerance range, or when no fill level value is determinable based on one of the received signals.

5. The fill-level measuring device as claimed in claim 4, wherein the evaluation unit is designed to output as the fill level an equally or unequally weighted average value of at least two of the first, second, and third fill level values.

6. The fill-level measuring device as claimed in claim 3, wherein the evaluation unit is designed, based on the first received signal, the second received signal, and/or the third received signal, to create a masking curve for an, in each case, other frequency band.

7. The fill-level measuring device as claimed in claim 4, wherein the fill-level measuring device is designed to transmit both the first transmitted radar signal and the second transmitted radar signal in a plurality of measuring cycles, wherein the evaluation unit ascertains based on corresponding received signals per frequency band, in each case, at least one defined characteristic variable.

8. The fill-level measuring device as claimed in claim 7, wherein the at least one defined characteristic variable is an amplitude of a signal maximum, a change or standard deviation of its amplitude, a noise level, and/or a number of signal maxima.

9. The fill-level measuring device as claimed in claim 8, where in the evaluation unit is further designed to compare the at least one defined characteristic variable of each frequency band to one another.

10. The fill-level measuring device as claimed in claim 9, wherein the signal production unit following the plurality of measuring cycles produces either the first transmitted radar signal or the second transmitted radar signal as a function of the characteristic variables comparison, and wherein the evaluation unit in a following measuring cycles ascertains fill level value based either on the first received signal or on the second received signal.

11. The fill level measuring device as claimed in claim 9, wherein the evaluation unit is designed to signal the defined event in the container as a function of the at least one characteristic variable ascertained in each case or as a function of the characteristic variables comparison.

12. The fill-level measuring device as claimed in claim 3, wherein the fill-level measuring device is configurable manually such that the signal production unit produces either the first transmitted radar signal, the second transmitted radar signal, or the third transmitted radar signal, wherein the evaluation unit determines a fill level value based on the corresponding received signal.

13. The fill-level measuring device as claimed in claim 3, wherein the antenna arrangement further includes a third primary radiator arranged in the focus of the lens, and the third primary radiator is embodied to transmit the third transmitted radar signal and to received the third received signal after reflection of the third transmitted radar signal on the fill substance surface.

14. The fill-level measuring device as claimed in claim 1, wherein the antenna arrangement is designed such that a radiation angle of a radar signal is greater the lower the frequency band.

15. The fill-level measuring device as claimed in claim 1, wherein the antenna arrangement is designed such that the radar signals are transmitted with an equal radiation angle.

16. The fill-level measuring device as claimed in claim 13, wherein the antenna arrangement is designed to transmit the first transmitted radar signal, the second transmitted radar signal, and/or the third transmitted radar signal with a defined polarization.

17. A method for operating a fill-level measuring device, comprising:

providing the fill-level measuring device, including:

a signal production unit that is designed:

to produce a first transmitted radar signal within a first frequency band, and to produce a second transmitted radar signal within a second frequency band that does not overlap with the first frequency band;

an antenna arrangement, including:

a first primary radiator embodied to transmit the first transmitted radar signal to the fill substance and to receive a first received signal after reflection the first transmitted radar signal on a fill substance surface;

a second primary radiator embodied to transmit the second transmitted radar signal to the fill substance and to receive a second received signal after reflection of the second transmitted radar signal on the fill substance surface; and a radar-focusing lens having a cross-sectional area that is a whole number multiple of a wavelength of the first transmitted radar signal or the second transmitted radar signal, whichever has a lower frequency, wherein the first primary radiator and the second primary radiator are arranged in a focus of the lens; and an evaluation unit, which is designed:

to determine a first fill level value based on the first received signal, and to determine a second fill level value based on the second received signal;

transmitting sequentially alternately the first transmitted radar signal and the second transmitted radar signal; and alternately receiving the first received signal and the second received signal.

* * * * *